United States Patent [19]
Chen et al.

[11] Patent Number: 6,146,445
[45] Date of Patent: Nov. 14, 2000

[54] STABILIZED PEROVSKITE FOR CERAMIC MEMBRANES

[75] Inventors: Chieh-Cheng Chen, Getzville; Ravi Prasad, East Amherst, both of N.Y.

[73] Assignee: Praxair Technology, Inc., Danbury, Conn.

[21] Appl. No.: 09/323,114

[22] Filed: Jun. 1, 1999

[51] Int. Cl.$^7$ .............................. B01D 53/22; C04B 35/50
[52] U.S. Cl. ................................... 95/45; 501/152; 95/54; 55/523; 502/4; 502/303; 502/304; 502/400; 502/502; 502/527.15
[58] Field of Search .................. 502/4, 303, 304, 502/527.15, 400, 502; 55/523; 95/45, 54; 501/152

[56] References Cited

U.S. PATENT DOCUMENTS

| | | | |
|---|---|---|---|
| 5,342,431 | 8/1994 | Anderson et al. | 95/45 |
| 5,380,692 | 1/1995 | Nakatsuji et al. | 502/303 |
| 5,648,304 | 7/1997 | Mazanec et al. | 501/134 |
| 5,702,999 | 12/1997 | Mazanec et al. | 501/152 |
| 5,712,220 | 1/1998 | Carolan et al. | 502/400 |
| 5,733,435 | 3/1998 | Prasad et al. | 205/765 |

FOREIGN PATENT DOCUMENTS

| | | |
|---|---|---|
| 778069 | 6/1997 | European Pat. Off. . |
| 61-21717 | 1/1986 | Japan . |

*Primary Examiner*—Elizabeth D. Wood
*Attorney, Agent, or Firm*—David M. Rosenblum

[57] ABSTRACT

A stable substantially cubic perovskite crystalline structure of at least one strontium-doped lanthanum cobalt oxide (LSC) having a stabilizing amount of at least one cerium gadolinium oxide (CGO) therein.

21 Claims, 2 Drawing Sheets

STABILIZED PEROVSKITE FOR CERAMIC MEMBRANES

U.S. GOVERNMENT RIGHTS

This invention was made with the U.S. Government support under Cooperative Agreement No. 70NANB5H1065 awarded by the National Institute of Standards and Technology. The U.S. Government has certain rights to this invention.

FIELD OF THE INVENTION

The present invention relates to a process for making a particular stable substantially cubic crystalline structure perovskite. Furthermore, the present invention relates to a new type of stable substantially cubic crystalline structure perovskite that is useful in oxygen separation membranes.

BRIEF DESCRIPTION OF ART

The separation of oxygen from an oxygen-containing gaseous stream is a process step in a number of commercially significant manufacturing operations. One method of oxygen separation utilizes a mixed conductor ceramic membrane material. Oxygen ions and electrons are selectively transported through the non-porous ceramic membrane material that is impervious to other species. Suitable ceramics include mixed conductor perovskites and dual phase metal-metal oxide combinations. Exemplary ceramic compositions are disclosed in U.S. Pat. No. 5,342,431 (Anderson et al.); U.S. Pat. No. 5,648,304 (Mazanec et al.); U.S. Pat. No. 5,702,999 (Mazanec et al.); U.S. Pat. No. 5,712,220 (Carolan et al.); and U.S. Pat. No. 5,733,435 (Prasad et al.) as well as in Japanese Patent Application (Kokai) No. 61-21717. All of these references are incorporated herein by reference in their entireties.

Ceramic membranes formed from solid electrolytes and mixed conducting oxides typically exhibit the property of oxygen selectivity. "Oxygen selectivity" means that only oxygen ions are transported across the membrane with the exclusion of other elements and ions. Particular advantageous solid electrolyte ceramic membranes are made from inorganic oxides, typically containing calcium- or yttrium-stabilized zirconia or analogous oxides having a fluorite or perovskite structure. Use of such membranes in gas purification applications is described in U.S. Pat. No. 5,733,435 (Prasad et al.) and European Patent Application No. 778,069 entitled "Reactive Purge for Solid Electrolyte Membrane Gas Separation" by Prasad et al.

Ceramic membrane materials have the ability to transport oxygen ions and electrons at the prevailing oxygen partial pressure in a temperature range of from 450° C. to about 1200° C. when a chemical potential difference is maintained across the membrane element. This chemical potential difference is established by maintaining a positive ratio of oxygen partial pressures across the ion transport membrane. The oxygen partial pressure ($P_{O2}$) is maintained at a higher value on the cathode side of the membrane, that side exposed to the oxygen-containing gas, than on the anode side, where the transported oxygen is recovered. This positive $P_{O2}$ ratio may be obtained by reacting transported oxygen with an oxygen-consuming process or fuel gas. The oxygen ion conductivity of a mixed conductor perovskite ceramic membrane is typically in the range of between 0.01 and 100 S/cm where S("Siemens") is reciprocal of ohms (1/Ω).

For effective application of a perovskite for oxygen separation, the perovskite should meet several requirements: (1) the perovskite should have a high oxygen flux, where flux is the rate of oxygen transport through the membrane structure; (2) the perovskite structure must be chemically stable at the operating temperature; (3) the perovskite must have a degree of mechanical stability; and (4) the perovskite must have a cubic crystalline structure over the entire range of operating temperatures. Perovskites with a hexagonal crystalline structure are not effective for oxygen transport. Some perovskites have a hexagonal crystalline structure at room temperature (nominally 20° C.) and undergo a phase transformation only at an elevated temperature. In such a material, the phase transformation temperature represents the minimum temperature at which an oxygen separator containing that material as a membrane element may be operated.

A number of mixed oxide perovskites have been disclosed as useful for oxygen separation. Illustrative perovskites are of the form $ABO_3$ where A is a lanthanide element, B is a transition metal and O is oxygen. A lanthanide, or rare earth element, is an element between atomic number 57 (lanthanum) and atomic number 71 (lutetium) in the Periodic Table of the Elements as specified by IUPAC. Typically, yttrium (atomic number 39) is included within the lanthanide group. The transition metals include titanium, vanadium, chromium, manganese, iron, cobalt, nickel, copper and zinc. The A component and/or the B component may be doped with other materials to enhance stability and performance.

One type of perovskite that has been studied extensively for potential application in oxygen separation membranes is strontium-doped lanthanum cobalt oxides ($La_{1-x}Sr_xCoO_{3-z}$) (also sometimes referred to herein as "LSC perovskites"). U.S. Pat. No. 5,648,304 (Mazanec et al.) disclosed high oxygen fluxes with $La_{0.05}Sr_{0.95}CoO_{3-z}$ perovskite (also sometimes referred to herein as "LSC95") at temperatures above about 900° C. Further tests with LSC95 revealed no oxygen flux at temperatures below about 850° C. It is believed that the reason for this deficiency is attributed to the structural transformation of LSC95 from a substantially cubic crystalline structure to hexagonal crystalline structure at temperatures at about 850° C.

Thus, there is a need in the art to improve the performance of LSC perovskites to be useful for oxygen separation membranes over a wider range than previously believed possible. In particular, there is a need for LSC perovskites that are stable against this unwanted structural transformation at temperatures below about 900° C., desirably as low as 500° C. or lower. The present invention provides a solution to this need.

BRIEF SUMMARY OF THE INVENTION

One aspect of the present invention is directed to a process for making a stable substantially cubic perovskite crystalline structure of at least one strontium-doped lanthanum cobalt oxide (also sometimes referred to herein as LSC) that comprises:

(1) incorporating a stabilizing amount of at least one cerium(Ce) gadolinium(Gd) oxide (sometimes referred to as CGO) in at least one strontium-doped lanthanum cobalt oxide at ambient temperatures and (2) then sintering the mixture to form a stabilized substantially cubic LSC perovskite crystalline structure.

Another aspect of the present invention is directed to, as a composition of matter, a stable substantially cubic perovskite crystalline structure of at least one strontium-doped lanthanum cobalt oxide (LSC) useful for an oxygen separation device having a stabilizing amount of at least one cerium gadolinium oxide (CGO) therein.

The CGO can be introduced into the LSC as a second phase or designated as a dopant in the LSC perovskite structure.

These stabilized LSC perovskites of the present invention possess sufficient oxygen conductivity to be useful for dense oxygen separation membranes at lower temperatures than are used with conventional LSC perovskites. The use of lower operating temperatures generally means lower operating costs, thus meaning these stabilized perovskites offer significant commercial advantages over conventional LSC perovskites. Furthermore, these stabilized LSC perovskites are stable (i.e., keep their cubic structure) at operating temperatures for long periods of time.

Another aspect of the present invention involves the use of CGO in a substrate or intermediate layer for a LSC perovskite film to improve the adhesion and thermal expansion between film and substrate and still obtain a superior oxygen flux for this composite film application.

BRIEF DESCRIPTION OF THE DRAWINGS

Other objects, features and advantages will occur to those skilled in the art from the following description of the preferred embodiments and accompanying drawings in which.

DETAILED DESCRIPTION OF THE PREFERRED EMBODIMENTS

Figure 1:
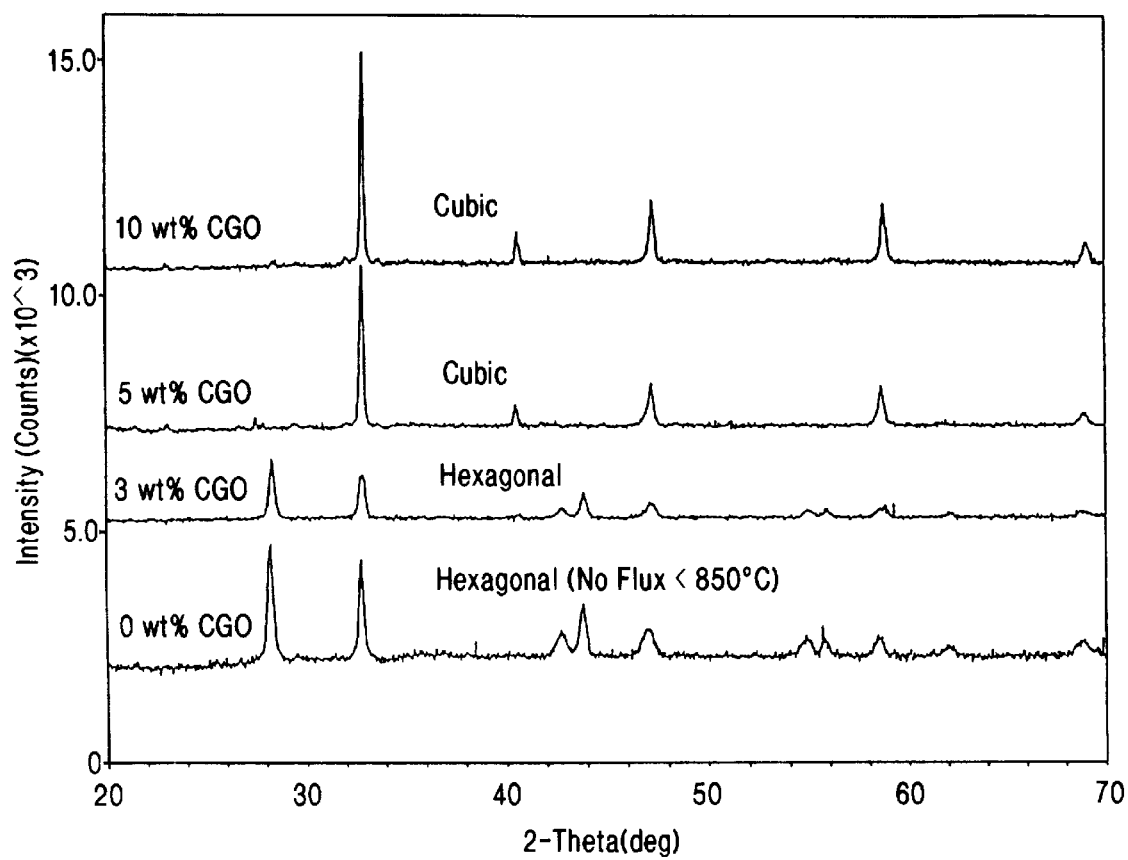
FIG. 1 shows room temperature X-ray diffraction of a LSC95 perovskite alone and with 3%, 5% and 10% by mole of CGO therein.

The present invention pertains to the incorporation of a stabilizing amount of a particular ionic conductor (e.g., CGO) into a LSC perovskite structure to form a stable substantially cubic crystalline structure that is stable at temperatures below the normal operating temperature ranges of LSC perovskite alone.

The term "stable substantially cubic crystalline structure" as used in the present specification and claims refers to a crystalline structure of a LSC perovskite that is substantially cubic in nature and does not undergo a substantial degree of unwanted structural transformation to a hexagonal crystalline structure so that this stabilized LSC/CGO perovskite is useful as an oxygen separation membrane material over a wider range of temperatures (especially lower temperatures) than the same LSC perovskite free of CGO.

The term "stabilizing amounts" as used in the present specification and claims means any suitable amount of CGO that is incorporated into the LSC perovskite structure that is sufficient to form a cubic crystalline structure at room temperature or above (and prevent the unwanted structural transformation to a hexagonal structure) so that the resulting perovskite structure is useful as an oxygen separation membrane material over a wider range of temperatures (especially lower temperatures) than the same LSC perovskite free of CGO. The preferred molar amount of CGO incorporated into the LSC perovskite may range from about $0.01 \leq CGO/LSC \leq 1$ and more preferably, from about $0.03 \leq CGO/LSC \leq 0.67$. The most preferred molar ratio of the CGO/LSC is from about $0.05 \leq CGO/LSC \leq 0.25$.

Any suitable LSC perovskite capable of forming a stable cubic crystalline structure with CGO may be used. Preferably, The LSC perovskite is of a formula $La_xSr_{1-x}CoO_{3-z}$ wherein x is from about 0.0001 to about 0.1 and z is a number determined by the stoichiometry of the formula. The most preferred LSC perovskite is LSC95 available from Praxair Specialty Ceramics, Inc. of Woodinville, Wash. LSC95 has the formula $La_{0.05}Sr_{0.95}CoO_{3-z}$ where z is defined above.

Any suitable cerium gadolinium oxide that results in the stabilized LSC perovskite may be used. Preferably, the CGO is of a formula $Ce_{1-y}Gd_yO_{2-z}$ wherein y is from about 0.01 to about 0.4 and z is a number determined by the stoichiometry of the formula. The most preferred CGO is $Ce_{0.8}Gd_{0.2}O_{2-z}$ available from Praxair Specialty Ceramics, Inc.

The stabilized LSC/CGO compounds of the present invention are generally prepared by mixing the LSC perovskite and CGO together in the presence of a suitable solvent [e.g. 2-propanol] containing a suitable binder [e.g. BUTVAR polyvinyl butyral (PVB) available from Solutia, Inc. (formerly Monsanto)]; then heating the resulting mixture to first evaporate the solvent (to 60° C.–120° C.). The mixtures may be then uniaxially pressed using a circular die and pressures from about 1,000 to about 20,000 psi. The resulting discs are then subjected to a binder burn-out process (i.e. the discs are heated from about 25° C. to about 400° C. at 1° C. per minute and then held at that temperature for one hour). This binder burn-out removes the binder from the discs, leaving only the LSC and CGO. The resulting heated discs are further heated to a sintering temperature (e.g., 1000° C.–1400° C.) at a rate of 2° C. per minute in an air atmosphere. Upon reaching the desired sintering temperature, the discs are held at that temperature for a sufficient amount of time (e.g., about 1 to about 12 hours) to form a dual phase or doped substantially cubic crystalline structure of LSC with CGO therein.

The resulting sintered discs are then suitable for use as oxygen separation membranes. These discs may be used in processes where oxygen is to be separated from oxygen-containing gas streams at a temperature from about 400° C. to about 800° C.

Other alternative ways to practice the invention include using the second phase as a substrate support or an intermediate layer to stabilize the cubic perovskite film to obtain a superior oxygen flux for the composite film applications.

Conventional porous substrates include alumina, yttria-stabilized zirconia, magnesia, titania, high temperature oxygen compatible metal alloys and compounds and mixtures thereof. In general, major considerations in the selection of the substrate material include: (1) the thermal expansion coefficient (TEC) match between the substrate and membrane material; (2) chemical compatibility (no adverse chemical reactions) between substrate and membrane material; (3) good bonding between substrate and membrane material; and (4) low cost.

In these alternative embodiments, the CGO layer is applied to a suitable substrate and then a LSC perovskite film or layer is applied over the CGO layer. The composite is then sintered to form a stabilized substantially cubic crystalline structure of the LSC perovskite with CGO therein in the composite.

The present invention is further described in detail by means of the following Examples and Comparisons. All parts and percentages are by mole and all temperatures are in degrees Celsius unless explicitly stated otherwise.

EXAMPLE 1

Preparation of a Stabilized Perovskite Containing
$La_{0.05}Sr_{0.95}CoO_{3-z}$ with 3 mole % $Ce_{0.8}Gd_{0.2}O_{2-z}$
(LSC95 -3CGO)

LSC95 -3CGO powders were prepared by mixing $La_{.5}Sr_{0.95}Co_{3-z}$ powder (Praxair Specialty Ceramics, Inc.) with 3 mole % of $Ce_{0.8}Gd_{0.2}O_{2-z}$ (Praxair Specialty Ceramics, Inc.) by using a Spex mixer (Spex Industries, Inc.), for about 15–20 minutes. The powders were then added into a 2-propanol solution containing 3 wt. % of polyvinyl bromide (PVB) (Butvar of Solutia), and mixed by a magnetic stirrer at 80° C. to evaporate the 2-propanol, then sieved through the siever with a mesh size of 150 microns before pressing. The dual phase discs were prepared using a 1.5 inch die under a pressure of 10.4 kpsi followed by the binder burn-out process (1° C./min from 25° C. to 400° C. and hold for 1 hour), and sintered at 1150° C. for 2 hours with a heating/cooling rate of 2° C./min in air. X-ray diffraction (XRD) analysis was performed using a Rigku miniflex diffractometer with $CuK_\alpha$ radiation for the phase development study of LSC95-3CGO. The XRD analysis is shown in FIG. 1.

EXAMPLE 2

Preparation of a Stabilized Perovskite Containing
$La_{0.05}Sr_{0.95}CoO_{3-z}$ with 5 mole % $Ce_{0.08}Gd_{0.2}O_{2-z}$
(LSC95 -5CGO)

LSC95-5CGO powders were prepared by mixing $La_{.5}Sr_{0.95}CoO_{3-z}$ powder (Praxair Specialty Ceramics, Inc.) with 5 mole % of $Ce_{0.8}Gd_{0.2}O_{2-z}$ (Praxair Specialty Ceramics, Inc.) by using a Spex mixer (Spex Industries, Inc.) for 15–20 minutes. The powders were then added into a 2-propanol solution containing 3 wt. % of PVB (Butvar of Solutia), and mixed by a magnetic stirrer at 80° C. to evaporate the 2-propanol, then sieved through the siever with a mesh size of 150 microns before pressing. The dual phase discs were prepared using a 1.5" die under a pressure of 10.4 kpsi followed by the binder burn-out process (1° C./min from 25 to 400° C. and hold for 1 hour), and sintered at 1150° C. for 2 hours with a heating/cooling rate of 2° C./min in air. X-ray diffraction analysis was performed using a Rigku miniflex diffractometer with $CuK_\alpha$ radiation for the phase development study of LSC95-5CGO. The XRD analysis is shown in FIG. 1. The oxygen permeation rate was measured using sintered disc specimens sealed in an alumina test cell with silver pastes.

Figure 2:
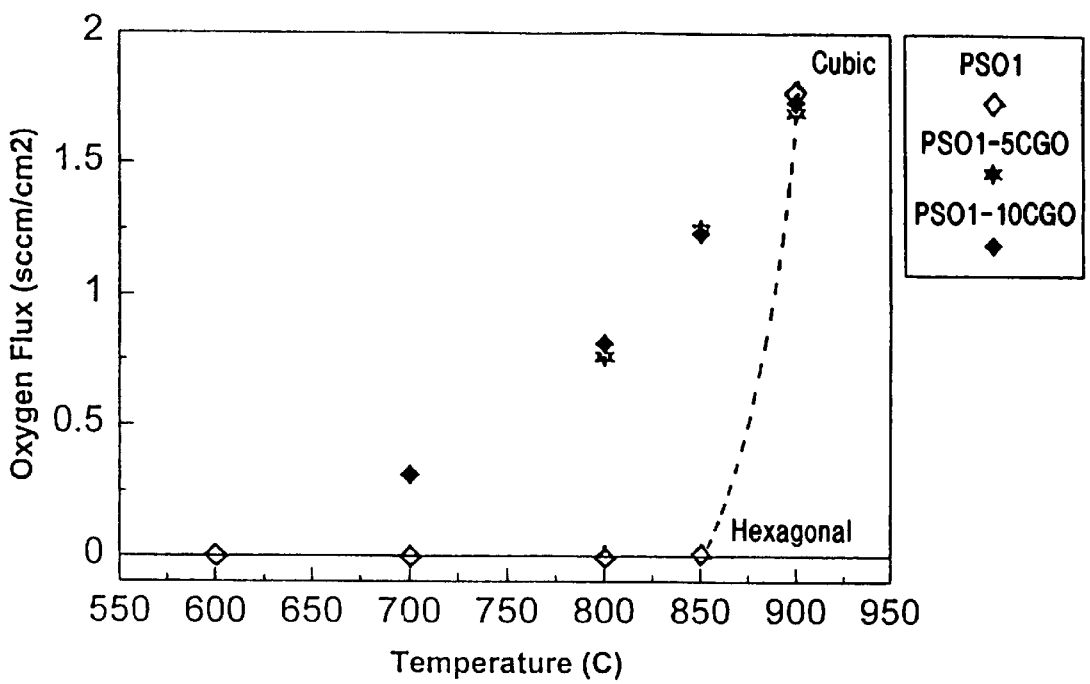
FIG. 2 shows oxygen fluxes of LSC95 perovskite alone and with 5% and 10% by mole of CGO therein.

Permeations were performed at the temperature of 800° C.–900° C. with He inert gas purge and different reactive purge gases. A HP 5890 Gas Chromatography, oxygen analyzer and moisture analyzer were used to analyze the gas compositions and calculate the oxygen fluxes. These oxygen fluxes are shown in FIG. 2.

EXAMPLE 3

Preparation of a Stabilized Perovskite Containing
$La_{0.05}Sr_{0.95}CoO_{3-z}$ with 10 mole % $Ce_{0.8}Gd_{0.2}O_{2-z}$
(LSC95-10CGO)

LSC95-10 CGO powders were prepared by mixing $La_{.05}Sr_{.95}CoO_{3-z}$ powder (Praxair Specialty Ceramics, Inc.) with 10 mole % of $Ce_{0.8}Gd_{0.2}O_{2-z}$ (Praxair Specialty Ceramics, Inc.) by using a Spex mixer (Spex Industries, Inc.), for 15–20 minutes. The powders were then added into a 2-propanol solution containing 3 wt. % of PVB (Butvar of Solutia), and mixed by a magnetic stirrer at 80° C. to evaporate the 2-propanol, then sieved through the siever with a mesh size of 150 microns before pressing. The dual phase discs were prepared using a 1.5" die under a pressure of 10.4 kpsi followed by the binder burn-out process (1° C./min from 25° C. to 400° C. and hold for 1 hour), and sintered at 1150° C. for 2 hours with a heating/cooling rate of 2° C./min in air. X-ray diffraction analysis was performed using a Rigku miniflex diffractometer with $CuK_\alpha$ radiation for the phase development study of LSC95 -5CGO. The oxygen permeation rate was measured using sintered disc specimens sealed in an alumina test cell with silver pastes. Permeations were performed at the temperature of 700° C.–900° C. with He inert gas purge. A HP 5890 Gas Chromatography oxygen analyzer and moisture analyzer were used to analyze the gas compositions and calculate the oxygen fluxes. This XRD analysis is shown in FIG. 1. This oxygen flux values are shown in FIG. 2.

FIG. 1 shows X-ray diffraction (XRD) of LSC95 alone and with different amounts of CGO, namely the LSC95-3CGO, LSC95-5CGO and LSC95-10CGO discs at room temperature. LSC95 alone and LSC95 with 3 % CGO discs possessed a hexagonal (or rhombohedral) structure at room temperature. Cubic perovskite structure was formed at room temperature for the LSC95 discs with 5 and 10 mole % CGO after sintering at 1150° C. (they could be completely indexed on the basis of cubic perovskite).

FIG. 2 shows the oxygen fluxes comparison of LSC95, LSC95-5CGO and LSC95-10CGO. LSC95 possessed an oxygen flux of 1.8 sccm/cm$^2$ at 900° C. but revealed no oxygen flux at the temperatures below about 850° C. It is mainly due to the structure transformation of LSC95 from cubic to hexagonal at low temperatures and is confirmed by the XRD study. The performance of LSC95-5CGO and LSC95-10CGO is comparable with $O_2$ fluxes of 1.7, 1.2, 0.7 sccm/cm$^2$ at 900° C., 850° C., and 800° C., respectively. FIG. 2 also showed no phase transformation at low temperature for LSC95-5CGO and LSC95-10CGO. This indicates cubic LSC95 can be stabilized from 900° C. to room temperature by the addition of sufficient amounts of CGO.

Figure 3:
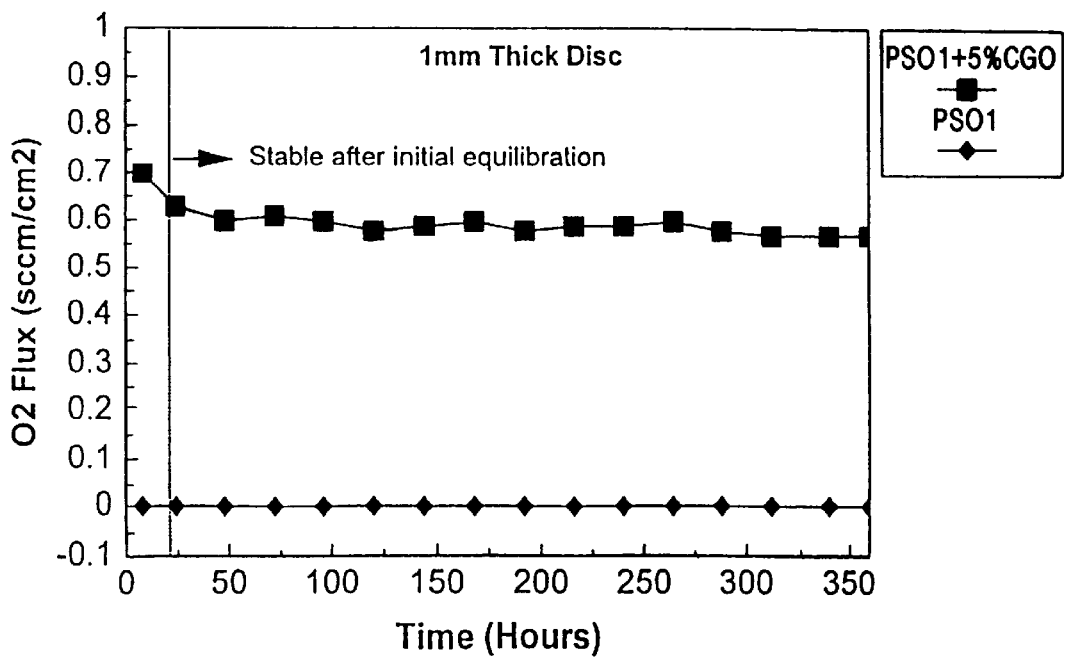
FIG. 3 shows the results of long term stability tests of LSC95 perovskite alone and with 5% by mole of CGO therein at 800° C.

Long term stability tests of LSC95-5CGO disc at 800° C. were also conducted and are shown in FIG. 3. The results in FIG. 3 indicate that the $O_2$ flux of the disc (1 mm thick) decreased slightly from 0.7 to 0.6 sccm/cm$^2$ initially using a He purge and remained a stable flux of 0.6 sccm/cm$^2$ over 360 hours at 800° C. Upon cooling to room temperature, the sample appeared intact and crack-free. This demonstrated that LSC95 with 5% CGO can be used as a stable oxygen transport membrane at low temperatures (<800° C.)

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for making a stable substantially cubic crystalline structure of at least one strontium-doped lanthanum cobalt oxide (LSC) perovskite that comprises:
    (a) incorporating a stabilizing amount of at least one cerium gadolinium oxide (CGO) to the LSC perovskite; and
    (b) sintering the mixture to produce a stable substantially cubic crystalline structure of LSC perovskite.

2. The process of claim 1 wherein the CGO is incorporated into the LSC as a second phase of the LSC perovskite structure.

3. The process of claim 1 wherein the CGO is incorporated into the LSC as a dopant in the LSC perovskite structure.

4. The process of claim 1 wherein said sintering is effected at a temperature from about 1000° C. to about 1400° C. for 1 to 12 hours.

5. The process of claim 1 wherein the strontium-doped lanthanum cobalt oxide perovskite is of the formula:

$$La_xSr_{1-x}CoO_{3-z}$$

wherein x is from about 0.0001 to about 0.1 and z is a number determined by the stoichiometry of the formula.

6. The process of claim 5 wherein the strontium-doped lanthanum cobalt oxide perovskite is of the formula:

$$La_{0.05}Sr_{0.95}CoO_{3-z}$$

wherein z is as defined.

7. The process of claim 1 wherein the cerium gadolinium oxide has the formula:

$$Ce_{1-y}Gd_yO_{2-z}$$

wherein y is from about 0.01 to 0.4 and z is a number determined by the stoichiometry of the formula.

8. The process of claim 1 wherein the cerium gadolinium oxide has the formula:

$$Ce_{0.8}Gd_{0.2}O_{2-z}$$

wherein z is as defined.

9. The process of claim 1 wherein the molar ratio of CGO to LSC is in the range from about $0.01 \leq CGO/LSC \leq 1.0$.

10. The process of claim 1 wherein the molar ratio of CGO to LSC is in the range from about $0.03 \leq CGO/LSC < 0.67$.

11. The process of claim 1 wherein the molar ratio of CGO to LSC is in the range from about $0.05 \leq CGO/LSC \leq 0.25$.

12. A composition of matter comprising a stable substantially cubic perovskite crystalline structure of at least one strontium-doped lanthanum cobalt oxide (LSC) having a stabilizing amount of at least one cerium gadolinium oxide (CGO) therein.

13. The composition of claim 12 wherein the strontium-doped lanthanum cobalt oxide perovskite is of the formula:

$$La_xSr_{1-x}CoO_{3-z}$$

wherein x is from about 0.0001 to about 0.1 and z is a number determined by the stoichiometry of the formula.

14. The composition of claim 13 wherein the strontium-doped lanthanum cobalt oxide perovskite is of the formula:

$$La_{0.05}Sr_{0.95}CoO_{3-z}$$

wherein z is as defined.

15. The composition of claim 12 wherein the cerium gadolinium oxide has the formula:

$$Ce_{1-y}Gd_yO_{2-z}$$

wherein y is from about 0.01 to 0.4 and z is a number determined by the stoichiometry of the formula.

16. The composition of claim 15 wherein the cerium gadolinium oxide has the formula:

$$Ce_{0.8}Gd_{0.2}O_{2-z}$$

wherein z is as defined.

17. The composition of claim 12 wherein the molar ratio of CGO to LSC is in the range from about $0.01 \leq CGO/LSC \leq 1.0$.

18. The composition of claim 12 wherein the molar ratio of CGO to LSC is in the range from about $0.03 \leq CGO/LSC \leq 0.67$.

19. The composition of claim 12 wherein the molar ratio of CGO to LSC is in the range from about $0.05 \leq CGO/LSC \leq 0.25$.

20. A composite composition comprising a substrate, a first layer of at least one cerium gadolinium oxide (CGO) and a second layer which comprises a stable substantially cubic perovskite crystalline structure of at least one strontium-doped lanthanum cobalt oxide (LSC) having a stabilized amount of at least one CGO therein.

21. A process for separating oxygen from an oxygen-containing gas stream at a temperature from about 400° C. to about 800° C. compromising the step of utilizing the composition of claim 12 as an oxygen separation membrane to separate oxygen from the oxygen-containing gas stream.

* * * * *

UNITED STATES PATENT AND TRADEMARK OFFICE
CERTIFICATE OF CORRECTION

| | | |
|---|---|---|
| PATENT NO. | : 6,146,445 | Page 1 of 1 |
| DATED | : November 14, 2000 | |
| INVENTOR(S) | : Chen et al. | |

It is certified that error appears in the above-identified patent and that said Letters Patent is hereby corrected as shown below:

<u>Claim 8,</u>
Line 1, delete "1", and insert -- 7 -- therefor.

Signed and Sealed this

Twenty-fifth Day of September, 2001

*Attest:*

*Attesting Officer*

NICHOLAS P. GODICI
*Acting Director of the United States Patent and Trademark Office*